United States Patent [19]

Hirata

[11] 4,439,791

[45] Mar. 27, 1984

[54] SLOW-MOTION REPRODUCING SYSTEM IN AN APPARATUS FOR REPRODUCING ROTARY RECORDING MEDIUM WITH MODE DEPENDENT SKIP PULSE GENERATOR AND FIELD MEMORIES

[75] Inventor: Atsumi Hirata, Fujisawa, Japan

[73] Assignee: Victor Company of Japan, Ltd., Yokohama, Japan

[21] Appl. No.: 246,722

[22] Filed: Mar. 23, 1981

[30] Foreign Application Priority Data

Mar. 21, 1980 [JP] Japan .................................. 55-35855

[51] Int. Cl.³ ............................................ H04N 5/76
[52] U.S. Cl. .................................. 358/342; 360/10.2; 369/43; 369/47; 369/126
[58] Field of Search .............. 358/342; 360/10.1, 10.2, 360/DIG. 1; 369/32-33, 41, 43, 47, 126

[56] References Cited

U.S. PATENT DOCUMENTS

| | | | |
|---|---|---|---|
| 4,190,859 | 2/1980 | Kinjo | 358/128.5 |
| 4,247,741 | 1/1981 | Tatsuguchi et al. | 369/43 |
| 4,322,748 | 3/1982 | Tatsuguchi | 358/128.5 |
| 4,330,791 | 5/1982 | Ohara et al. | 358/8 |
| 4,330,879 | 5/1982 | Wine | 369/33 |
| 4,331,976 | 5/1982 | Kinjo et al. | 358/128.6 |
| 4,340,907 | 7/1982 | Hirata et al. | 358/128.6 |

Primary Examiner—Raymond F. Cardillo, Jr.

Attorney, Agent, or Firm—Louis Bernat

[57] ABSTRACT

Slow-motion reproducing system is applied to an apparatus for reproducing video signals from a rotary recording medium on which the video signals of a plurality of fields each are recorded along a spiral track for every interval corresponding to one revolution of the medium. This system comprises a reproducing element for tracing along the track of the rotary recording medium and reproducing the signals recorded therealong, a device for causing the reproducing element to shift and skip to an adjacent track turn in response to skip pulses applied thereto, a circuit for generating skip pulses corresponding to modes in which slow-motion reproduction differing from normal reproduction is carried out every period of revolution of the rotary recording medium, the skip pulses being thus generated with timing corresponding to the vertical blanking period positions of the recorded video signals, and for supplying the skip pulses to the skip device, a circuit for demodulating the reproduced signal extracted from the reproducing element, first and second field memories respectively supplied with demodulated video signals extracted from the demodulating circuit, and an operation control circuit for carrying out operation control of the operations of recording of the demodulated video signals of the recorded video signals. Slow-motion reproduced video signals are produced as outputs alternately from the two field memories.

6 Claims, 8 Drawing Figures

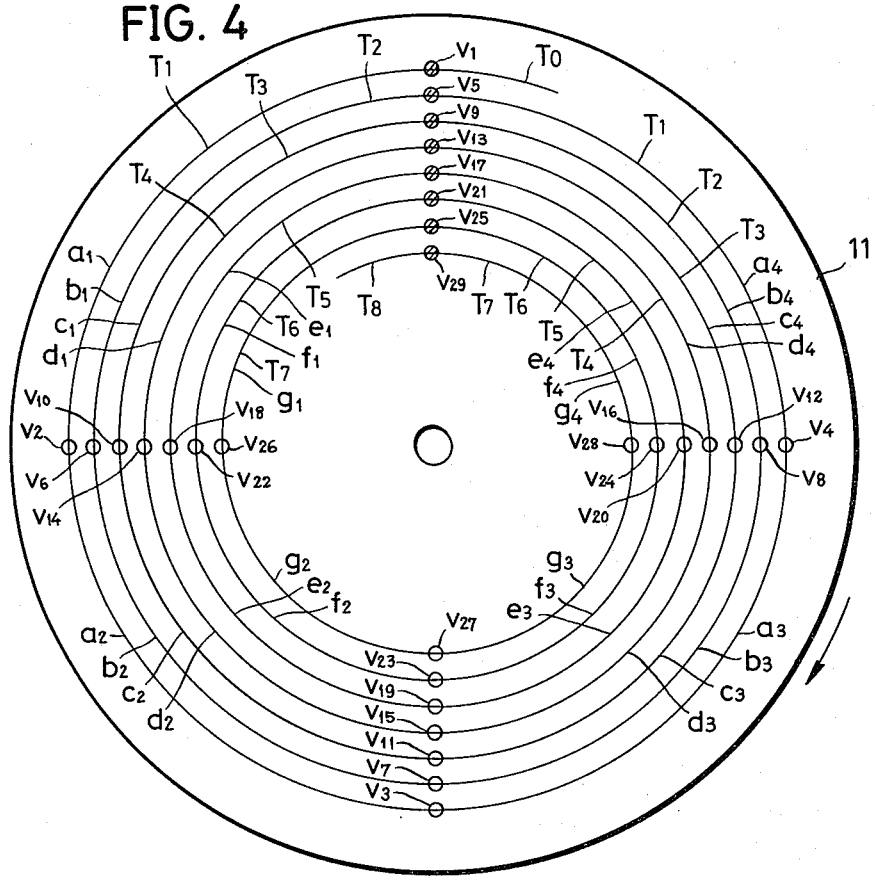
FIG. 4
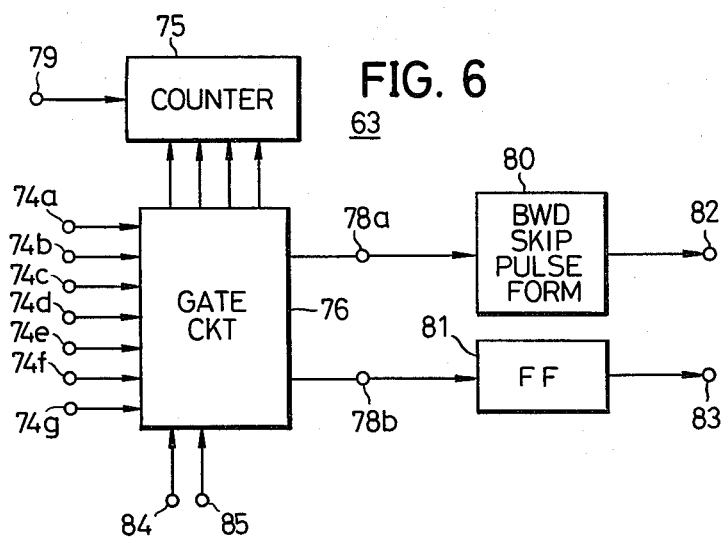
FIG. 6
FIG. 8

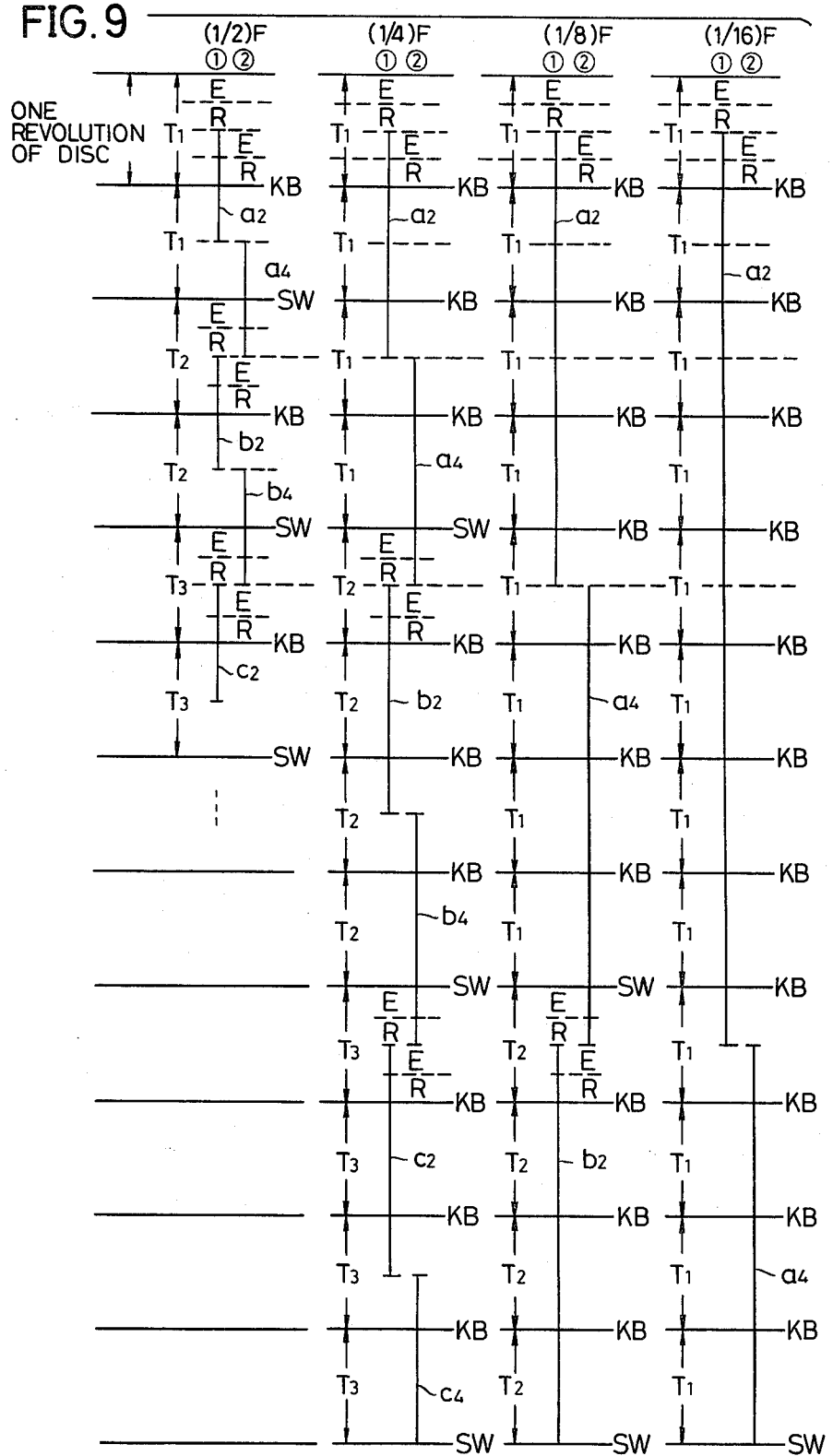

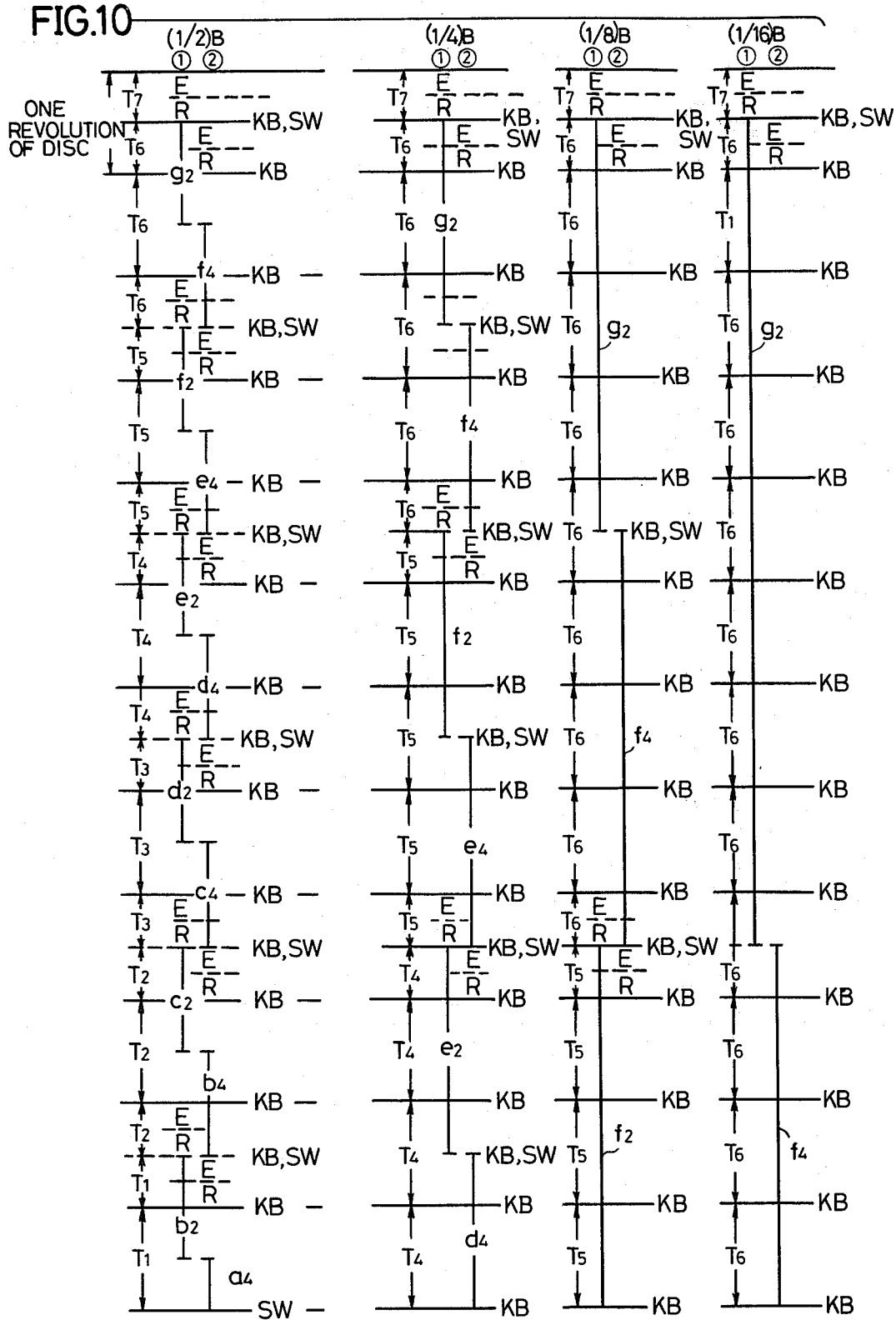

SLOW-MOTION REPRODUCING SYSTEM IN AN APPARATUS FOR REPRODUCING ROTARY RECORDING MEDIUM WITH MODE DEPENDENT SKIP PULSE GENERATOR AND FIELD MEMORIES

BACKGROUND OF THE INVENTION

The present invention relates generally to slow-motion systems in apparatuses for reproducing rotary recording mediums. More particularly, the invention relates to an apparatus of the type for reproducing, from a rotary recording medium on which signals have been recorded along a spiral track, the signals by means of a reproducing transducer, in which apparatus one and the same track turn is repeatedly reproduced a plural number of times by the reproducing transducer, and thereafter the reproducing transducer is shifted to the adjacent track turn to repeatedly reproduce a plural number of times thereby to obtain a slowmotion reproduced picture. More specifically, the invention relates to a system for reproducing the picture with minimal oscillation thereof in this slow-motion reproduction.

A new information signal recording and/or reproducing system has been proposed in a U.S. Pat. application Ser. No. 785,095 entitled "INFORMATION SIGNAL RECORDING SYSTEM" filed Apr. 6, 1977, now U.S. Pat. No. 4,331,976, of which the assignee is the same as that of the present application. According to this proposed system, the recording system forms pits in accordance with the information signal being recorded along a spiral track on a flat disc shaped recording medium (hereinafter referred to as disc), without forming a groove therein. In this reproducing system, a reproducing stylus traces over along this track thereby to reproduce the recorded information signal in response to variations in the electrostatic capacitance.

In this system, since a groove for guiding the reproducing stylus is not provided on the disc, pilot or reference signals should be recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

By the use of this previously proposed system, there is no possibility whatsoever of the reproducing stylus or the disc being damaged since the recording track has no groove. The stylus can trace the same portion of the track repeatedly many times, whereby a special reproduction such as still, slow motion, or quick motion reproduction becomes possible.

Thus, in a U.S. Pat. application Ser. No. 4,813 entitled "SPECIAL REPRODUCING SYSTEM IN AN APPARATUS FOR REPRODUCING VIDEO SIGNALS FROM A ROTARY RECORDING MEDIUM" filed Jan. 19, 1979, now U.S. Pat. No. 4,340,907, of which the assignee is the same as that of the present application, a special reproducing system in a disc reproducing apparatus was proposed which is capable of performing a special reproduction in which a picture having a motion different from the upon normal reproduction is obtained in an excellent manner.

The special reproducing system comprises a reproducing element for tracing the track of the disc and picking up the recorded signal, a tracking control mechanism for operating in response to skip pulses applied thereto to cause the reproducing element to shift to an adjacent track turn of the spiral track thereby to undergo skipping, and a skip pulse generating circuit for generating skip pulses with timings corresponding to the vertical blanking period positions of the recorded video signal, where the skip pulses are of a number corresponding to an operational mode for carrying out a special reproduction differing from normal reproduction at every rotational period of the rotary recording medium, and supplying the skip pulses to the tracking control mechanism. The reproducing element is skipped to an adjacent track turn within the vertical blanking period of the recorded video signal, by the tracking control mechanism responsive to the skip pulses.

Accordingly, the noise introduced when the reproducing element moves to an adjacent track does not appear in the picture, and a special reproduction such as still reproduction, slow-motion and quick-motion reproduction in the forward direction, and normal-speed, slow-motion, and quick-motion reproduction in the backward direction can be performed in which a fine picture is obtained.

A standard specification wherein a video signal corresponding to two frames, that is, four fields, is recorded ordinarily for one track turn (the portion of the spiral track corresponding to one revolution of the recording disc) is established by conditions for practical use such as the quantity of recording on the disc, the rotational speed of the disc, and the diameter of the disc. By repeating the operation of repeatedly reproducing n times, by means of the special reproducing system of the above mentioned proposal, one and the same track turn of a disc recorded in conformance with this standard specification, shifting to the adjacent track turn after thus reproducing, and again repeatedly reproducing this adjacent track turn n times, a reproduced picture of slow motion of n times can be obtained.

However, when slow-motion reproduction by means of the special reproducing system of the above mentioned proposal of a disc on which a video signal corresponding to two frames is recorded on each track turn is carried out in this manner, the information contents (pictures) of two different frames are alternately superposed and give rise to an oscillation of the picture.

SUMMARY OF THE INVENTION

Accordingly, it is a general object of the present invention to provide a novel and useful slow-motion reproducing system in a rotary recording medium reproducing apparatus, in which system the problems accompanying the special reproducing system of the above mentioned proposal have been solved.

Another and specific object of the invention is to provide a slow-motion reproducing system in a rotary recording medium reproducing apparatus in which system a slow-motion reproduced picture of high quality can be obtained by using two field memories, recording therein the reproduced video signal of a disc, and appropriately carrying out the operation of reproducing the signal thus recorded in these field memories.

Still another object of the invention is to provide a slow-motion reproducing system in a rotary recording medium reproducing apparatus in which system, in the case where the slow-motion ratio is the same in both forward-direction reproduction and backward-direction reproduction, the recording and reproducing controls with respect to the two field memories can be carried out by the same method.

BRIEF DESCRIPTION OF THE DRAWINGS

FIG. 4 is a diagrammatic plan view indicating vertical synchronizing signal positions on a track pattern of a rotary recording medium:

FIG. 6 is a systematic block diagram showing one embodiment of a pulse generating circuit constituting an essential part of the special reproduction system shown in FIG. 5:

FIG. 8 is a time chart showing waveforms of the skip pulses obtained from the circuits shown in FIG. 7:

FIG. 9 is a diagrammatic chart indicating the procedural sequence of operation control of two field memories at the time of forward-direction, slow-motion reproduction by the system of the invention; and FIG. 10 is a diagrammatic chart indicating the procedural sequence of operation control of the two field memories at the time of backward-direction, slow-motion reproduction by the system of the invention.

DETAILED DESCRIPTION

Figure 1:
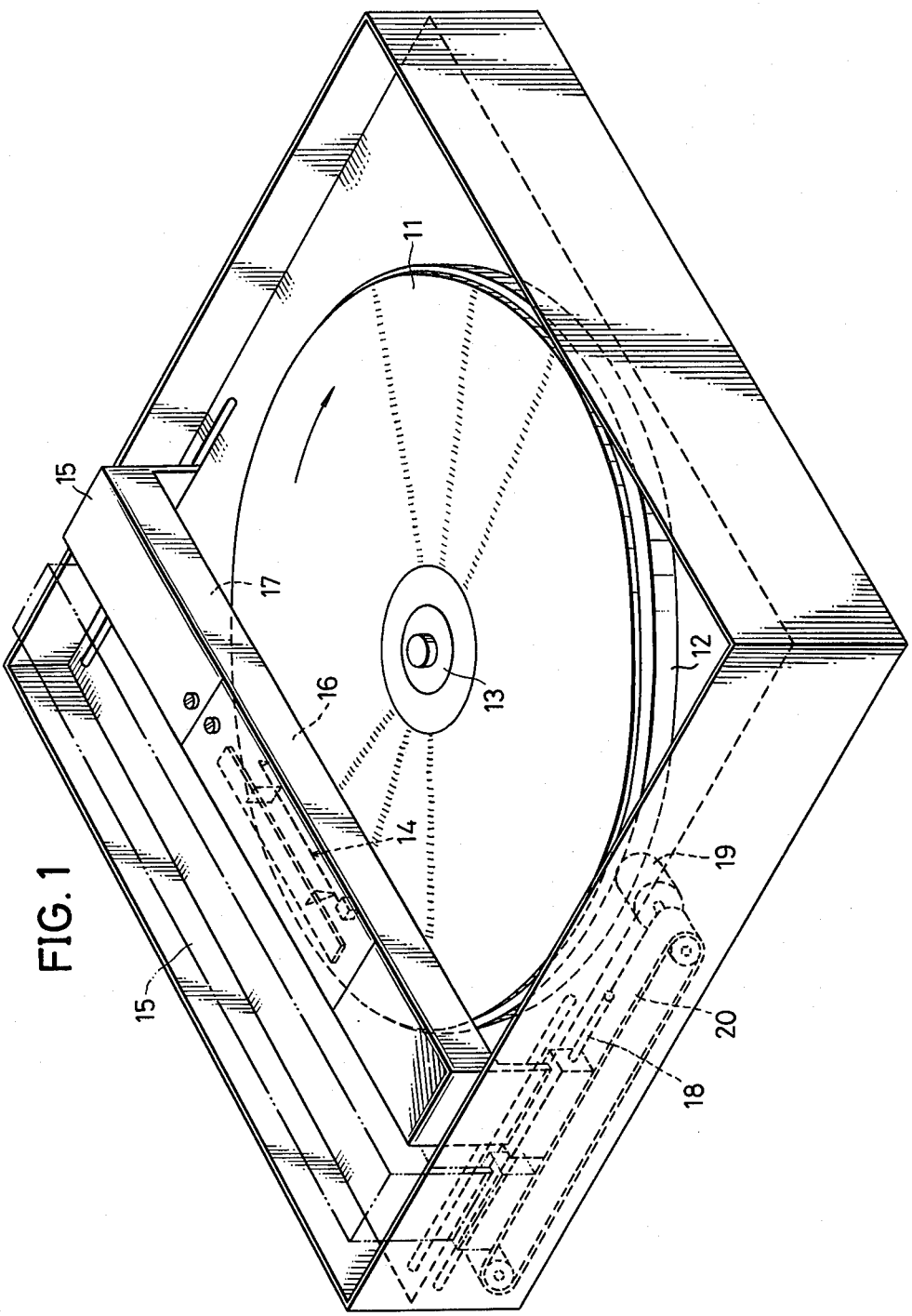
FIG. 1 is a perspective view showing an example of a rotary recording medium reproducing apparatus to which a reproduction system according to the present invention can be applied.

The general features of the exterior of a reproducing apparatus for reproducing a rotary recording medium, in which a slow-motion reproducing system according to the invention can be applied, is illustrated in FIG. 1. In this apparatus, a disc 11 is a rotary recording medium having a video signal recorded thereon. The disc 11 is set on and clamped onto a turntable 12 by a clamper 13. The disc 11 is thus rotated unitarily with the turntable 12 at a rotational speed of 900 rpm, for example.

A signal pickup device 14, used as a reproducing transducer (reproducing element), is mounted at a reentrant cylindrical cavity resonator 16 within a carriage 15. The pickup is connected to a central conductor (not shown) of the resonator. The central conductor is electro-magnetically connected to a high frequency oscillator 17 for producing a frequency of 1 GHz, for example. This organization is well known. The carriage 15 is disposed horizontally above the turntable 12, and is guided at its ends by a pair of parallel horizontal guide bars 18 (only one shown). This carriage 15, driven by an endless belt 20 which is driven by a motor 19, moves intermittently and linearly in a direction from the outer peripheral part to the inner peripheral part at a speed equal to the distance of 32 track pitches per 32 revolutions of the turntable 12, during a forward normal reproducing mode. The carriage movement is in synchronism with the rotation of the turntable. As a result of this movement of the carrier 15, a stylus of the signal pickup device 14 travels radially across the rotating disc 11 and relatively traces the spiral track of the disc 11.

Figure 2:
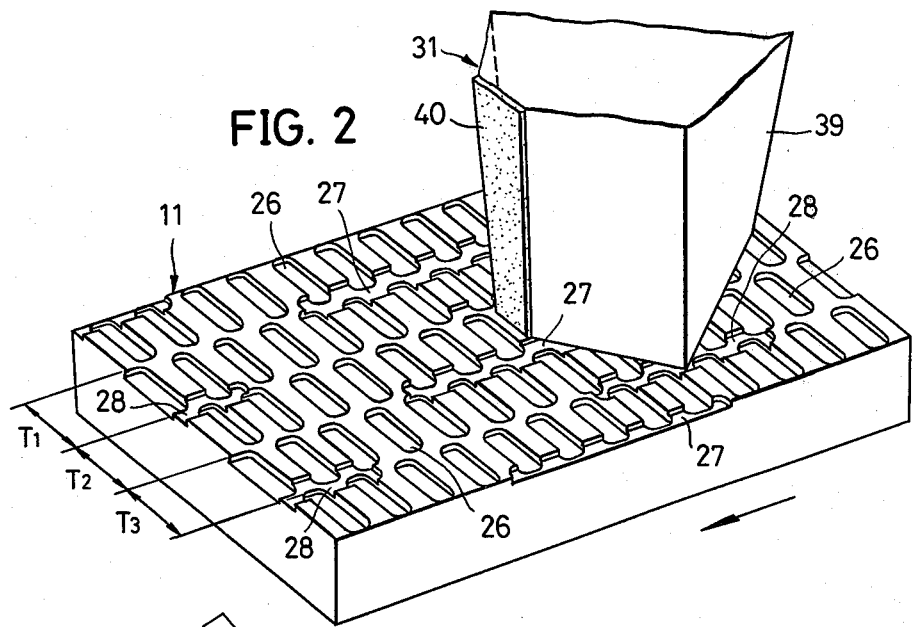
FIG. 2 is a perspective view, on a large scale, showing a part of a rotary recording medium together with a tip part of a reproducing stylus.

A video signal is recorded on a spiral track with pits formed on the disc 11 responsive to the information contents of the signal. One part of this track is shown in an enlarged scale in FIG. 2. In FIG. 2 track turns of a single continuous spiral track, corresponding to each revolution of the disc 11, are designated by $T_1, T_2, T_3$. . . . Each track turn is constituted by the formation of pits 26 of the main information signal along the plane track path and has no stylus guide groove formed therein. With respect to one track turn $T_1$, in every horizontal scanning period (H) at a position corresponding to the horizontal blanking period, pits 27 of the first reference signal fp1 are formed on one lateral side of the track as viewed in the track path direction. Pits 28 of the second reference signal fp2 are formed on the other side of the track.

In an intermediate position between the centerlines of adjacent track turns, only pits of either one kind of the pits 27 and 28 of the above reference signals fp1 and fp2 are formed, and with respect to one track, moreover, the sides on which the pits 27 and 28 are formed are alternated for every track turn. That is, if pits 27 and 28 are respectively formed on the right and left sides of one track turn, for example, pits 28 and 27 will respectively be formed on the right and left sides of each of the adjacent track turns.

On the disc 11, as indicated in FIG. 4, a video signal is recorded along a spiral track for two frames, that is, four fields, per one revolution of the disc. In FIG. 4, the tracks of the reference signals fp1 and fp2 are omitted. The positions of the vertical synchronizing signals of respective fields are designated by reference characters $V_1, V_2, V_3, \ldots$, and the successive track parts corresponding to one revolution of the disc of a single spiral track I will respectively be designated by track turns $T_1, T_2, T_3, \ldots$ Furthermore, a third reference signal fp3 is recorded at the starting end positions V1, V5, V9, ... of each track turns T1, T2 T3, . . . . A video signal of four fields, namely A1, A2, A3, and A4, is recorded in the track $T_1$. A signal having the same information contents as the first frame (fields A1 and B1) is also recorded as the signal of the second frame (fields A3 and A4), so that the above described flicker in the reproduced picture is not introduced upon still reproduction. Similarly, frame signals having information contents of every second frame are recorded in groups of two frames in the tracks $T_2$, $T_3$ $T_4$, . . . respectively as signals comprising four fields, that is, B1 through B4, C1 through C4, D1 through D4, . . . Letters a through g designate video signals respectively recorded on the tracks $T_1$ through $T_7$. Subscripts for the letters a through g designate a sequence of fields starting from the recorded position of the third reference signal fp3 on each track.

Figure 3:
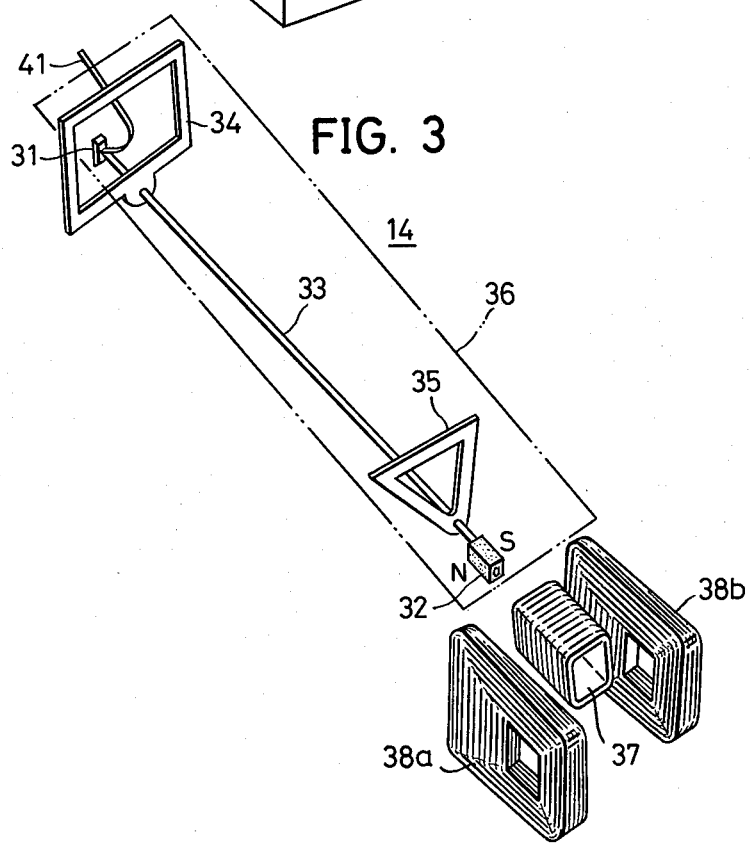
FIG. 3 is an exploded perspective view showing an example of a reproducing transducer in the reproducing apparatus shown in FIG. 1.

One example of the signal pickup device 14 indicated in FIG. 1 will now be described with reference to FIG. 3. This pickup device 14 has a relatively long cantilever arm 33 provided with a reproducing stylus 31 at its distal free end and a permanent magnet member 32 at its proximal root end. This cantilever arm 33 is supported by dampers 34 and 35 which are fixed to the lower surface of a support plate 36.

The support plate 36 is fitted into and held by a holding structure. A coil 37 used for tracking and a pair of coils 38a and 38b used for jitter compensation disposed on both sides of the coil 37, are fixed to the lower surface of the support plate 36. The above permanent magnet member 32 is fitted into the coil 37 with gaps formed therebetween.

The tip end of the reproducing stylus 31 has a shape shown in FIG. 2. The reproducing stylus 31 is constituted by a stylus structure 39 having a disc tracing surface which has a width greater than a track width, and an electrode 40 fixed to the rear face of the stylus structure 39. The electrode 40 is connected with a metal ribbon 40, as shown in FIG. 3. As the reproducing stylus 31 traces along a track on the disc 11 rotating in a direction indicated by arrow, the video signal recorded thereon by the formation of pits is reproduced as variations in the electrostatic capacitance between the surface of the disc 11 and the electrode 40 of the reproducing stylus 31.

Figure 5:
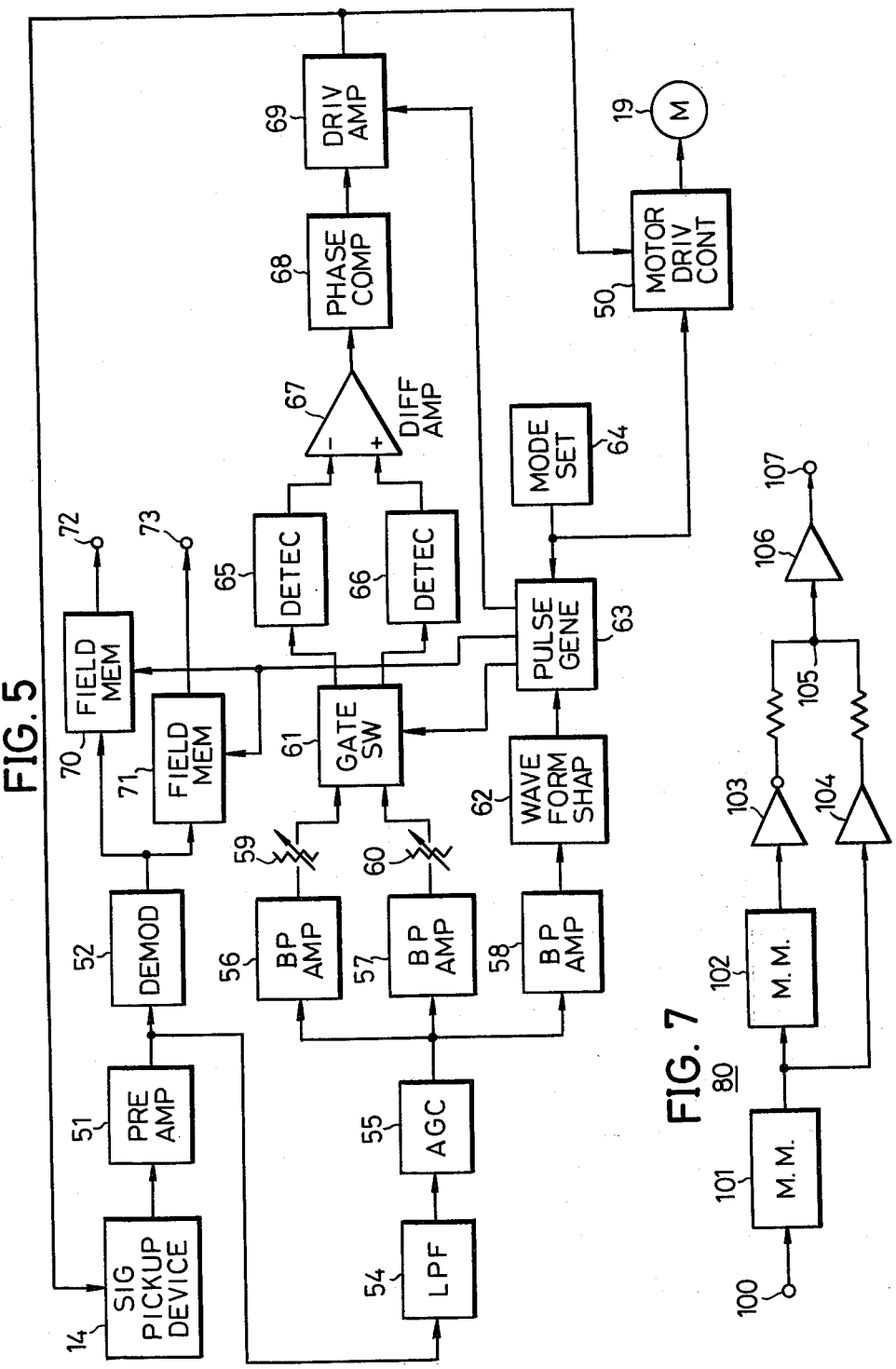
FIG. 5 is a systematic block diagram showing one embodiment of a slow-motion reproduction system according to the present invention in a rotary recording medium reproducing apparatus.

In the system shown in FIG. 5, a reproduced signal picked up from the disc 11 as minute variations in the electrostatic capacitance by the reproducing stylus 31 of the signal pickup device 14, is supplied to a preamplifier 51 having a resonant circuit. The resonance frequency of the resonant circuit varies in response to this variation in the electrostatic capacitance, and is formed into a signal of a desired level. The resulting output of the preamplifier 51, is demodulated into the original video signal by a demodulator 52 and is supplied to two field memories 70 and 71 described hereinafter, and then derived from output terminals 72 and 73 as outputs.

The output signal of the preamplifier 51 is supplied to a lowpass filter 54 wherein the reference signals fp1, fp2, and fp3 are separated. The output reference signals pass through an automatic gain control circuit 55 and are respectively supplied to amplifiers 56, 57, and 58. Here, each of the amplifiers 56, 57, and 58 is a kind of a band-pass amplifier respectively designed to have steep passing frequency characteristics at only the respective frequency fp1, fp2, and fp3. As a result, the signals having frequency fp1, fp2, are respectively separated and obtained from the amplifiers 56 and 57. These signals respectively pass through level adjustors 59 and 60, wherein the levels of the signals are adjusted. The resulting signals are then supplied to a gate switching circuit 61.

The signal fp3 separated and amplified at this bandpass amplifier 58, is supplied to a waveform shaping circuit 62 comprising a Schmitt trigger circuit. The signal thus supplied to the waveform shaping circuit 62 undergoes waveform-shaping so that the signal is not affected by noise and other influences. The signal thus subjected to the above waveform-shaping is then supplied to a pulse generating circuit 63. The resulting output switching pulses obtained from this pulse generating circuit 63, are supplied to the gate switching circuit 61.

The gate switching circuit 61 performs switching of the signals fp1 and fp2 every one revolution period of the disc 11 upon normal reproduction, in response to the above switching pulses applied thereto. Hence, due to the switching pulses which reverse polarity every two frames (1/15 seconds), namely, every one rotation period of the disc 11, the reference signals reproduced from the outer side and inner side of the track are respectively supplied to detecting circuits 65 and 66 with predetermined polarities, from the gate switching circuit 61.

The detecting circuits 65 and 66 detect the envelopes of their respective input reference signals and convert the input reference signals into DC voltages. These DC voltages are then supplied to a differential amplifier 67. The differential amplifier 67 compares the output signals of the two detecting circuits 65 and 66 which vary in response to the reproduced levels of the signals fp1 and fp2, and generates an output tracking error quantity. This error signal passes through a phase compensation circuit 68 and is further amplified to a specific level by a driving amplifier 69.

The output signal of the driving amplifier 69 is applied to the coil 37 of the signal pickup device 14 as a control signal, to control the signal pickup device 14. As a result, the permanent magnet member 32 undergoes displacement within the coil 37, and, accompanied by this movement of the coil 37, the cantilever 33 also undergoes displacement, whereby the reproducing stylus 31 is tracking controlled so that the above tracking error signal becomes zero, that is, so that the stylus 31 correctly traces over the spiral track of the disc 11. Furthermore, the output signal of the driving amplifier 69 is also supplied to a motor driving control circuit 50 to control the rotational driving of the motor 19 which moves the signal pickup device 14, so that a tracking control is performed in a state where the cantilever of the signal pickup device 14 is constantly positioned at the neutral position.

The pulse generating circuit 63 operates in response to the reproducing mode set by a control part 64 for setting the reproducing mode, and generates switching pulses and skip pulses. The switching pulse is supplied to the gate switching circuit 61 and the skip pulse is supplied to the driving amplifier 69.

One embodiment of the pulse generating circuit 63 which forms an essential part of the block system shown in FIG. 5 will now be described with reference to FIG. 6.

The reference signal fp3 introduced through the terminal 79 is supplied also to a counter 75, which produces outputs frequency divided respectively into $\frac{1}{2}$, $\frac{1}{4}$, $\frac{1}{8}$, and 1/16. These outputs are supplied to a gate circuit 76. This gate circuit 76 has terminals 74a through 74g to which are applied signals respectively in accordance with the reproducing mode setting of the reproducing mode setting control part 64. A signal due to still reproducing mode setting is applied to the terminal 74. Signals respectively due to settings for $\frac{1}{2}$, $\frac{1}{4}$, $\frac{1}{8}$, and 1/16 slow-motion reproduction in the forward direction are applied respectively to the terminals 74b, 74c, 74d, and 73e. Signals respectively due to settings for slow-motion reproduction in the forward and backward directions are applied respectively to the terminals 74f and 74g. The gate circuit 76 has output terminals 78a and 78b through which pulses are obtained. These output pulses are fed respectively to the backward direction skip pulse forming circuit 80 and the flip-flop 81.

The signals thus fed to the backward direction skip pulse forming circuit 80 are formed therein respectively into skip pulses of the backward direction of specific waveforms, which are led out through an output terminal 82 and supplied to the driving amplifier 69. The output switching pulses of the flip-flop 81 are led out through an output terminal 83 and supplied to the gate switching circuit 61.

For example, at the time of forward $\frac{1}{8}$ slow-motion reproduction, the gate circuit 76 supplies backward skip pulses in a proportion of 7 pulses per 8 pulses of the signal fp3, that is, 7 revolutions per 8 revolutions of the disc 11, through the backward direction skip pulse forming circuit 80 and still reproduction is carried out during 7 revolutions out of 8 revolutions of the disc 11. Furthermore, backward skip pulses are not generated in a proportion of 1 pulse per 8 pulses of the signal fp3, and the state becomes that of normal reproduction. Thus, forward ⅛ slow-motion reproduction is carried out. Forward ½, ¼, and 1/16 slow-motion reproduction are similarly accomplished.

As a result of setting of a forward slow-motion reproduction mode, a signal from the terminal 74f is fed to the gate circuit 76. In addition, the signal fp3 from the terminal 84 is supplied to the gate circuit 76. Accordingly, a pulse is supplied through the output terminal 78b to the flip-flop 81 from the gate circuit 76, to invert the switching pulses, only upon reproduction of the signal fp3 when the backward direction skip pulses are not generated.

Next, in the case of backward slow-motion reproduction, the gate circuit 76 supplies a pulse to the output terminal 78a every time the signal fp3 is reproduced. Therefore, backward skip pulses are formed every revolution of the disc 11, and the reproducing stylus is caused to skip radially outward relative to the disc, at the recording positions V1, V5, V9, . . . , where the signal fp3 is recorded.

Furthermore, vertical synchronizing signals reproduced at positions V3, V7, V11, . . . on the diametrically opposite side of the disc 11 from the positions V1, V5, V9, . . . at which the signal fp3 is recorded are supplied to the gate circuit 76 from the terminal 85. Accordingly, in the case of ½ or ¼ slow-motion reproduction, an output is obtained from the output terminals 78a and 78b in accordance with the timings of the vertical synchronizing signals reproduced at the above mentioned positions V3, V7, V11, . . . in the proportion of once per two revolutions of the disc 11. Upon ⅛ on 1/16 slow-motion reproduction, the above output is obtained in the proportion of once per four, or eight revolutions of the disc 11. This output is supplied to the backward skip pulse generating circuit 80 and the flip-flop 79.

Therefore, upon 1/n slow-motion reproduction, still reproduction is carried out during (n−1) revolutions out of n revolutions of the disc 11, and reproduction advances at normal speed in the backward direction during one revolution. Thus, backward 1/n slow-motion reproduction is accomplished.

Figure 7:
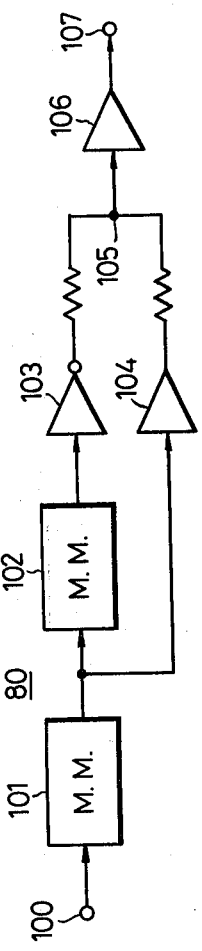
FIG. 7 is a systematic circuit diagram showing an embodiment of the skip pulse forming circuit shown in FIG. 6.

The backward skip pulse forming circuit 80 has a circuit organization, for example, as shown in FIG. 7. The signal from the output terminal 78a of the gate circuit 76 is applied to an input terminal 100 of this circuit 80 and trigger a monostable multivibrator 101. The rising and falling edges of the waveform of the output signal of this monostable multivibrator 101 trigger a monostable multivibrator 102. The output of the monostable multivibrator 102 is inverted by an inverter 103 and, at a point 105, is added to the output of monostable multivibrator 101 after it has passed through an amplifier 104. The signal resulting from this addition is passed through an amplifier 106 and is led out through an output terminal 107 as backward skip pulses of a waveform as indicated in FIG. 8.

Next, the procedure of controlling the operations of the two field memories 70 and 71 shown in FIG. 5 at the time of forward-direction, slow-motion reproduction in the system of the present invention will be described in conjunction with FIG. 9.

First, at the time of half-speed, forward-direction, slow-motion reproduction, the operation control indicated below the portion designated by (½)F in FIG. 9. is carried out with respect to the two field memories 70 and 71. Here, in FIG. 9 and in FIG. 10 described hereinafter, column designations ① and ② respectively designate the two field memories 70 and 71, the part of the chart below each indicating the operation of the corresponding field memory. The symbol E indicates erasing of the signal memorized in the field memories 70 and 71, and R indicates recording (storing) of a signal in the field memories. A full line indicates the reproducing (reading-out) period of the signal recorded in the field memories 70 and 71. Furthermore, in FIGS. 9 and 10, KB indicates a time instant at which the reproducing stylus is caused to skip (kick back) toward the outer periphery through one track pitch by the generation of a skip pulse in the backward direction, and SW indicates an instant of inversion of the aforementioned switching pulse.

At the time of slow-motion reproduction in the forward direction at half speed, one and the same track turn is reproduced twice, and then the reproduction is shifted to the succeeding track turn as described hereinbefore. At the time of this reproduction, the first field memory 70 is first caused to undergo an erasing operation indicated by E in the interval during which the first video signal a1 of the field is being reproduced in the period of one disc revolution in which the initial track turn T1 is reproduced, as indicated below column designation ① of (½)F in FIG. 9 and, thereafter, in the interval in which the video signal a2 of the succeeding field is reproduced, records this video signal a2. Furthermore, the first field memory 70 carries out reproduction of the recorded video signal a2 in the third and fourth field periods of the track turn T1.

On the other hand, in the reproducing period of the initial one disc revolution of the above mentioned track turn T1, the second field memory 71 is caused to undergo an erasing operation at the reproduction time of the third field period of the track turn T1 as indicated below column designation ② of (½)F in FIG. 9, and thereafter a reproduced video signal a4 is recorded therein as indicated at R in the fourth field period.

Then, in the period of one disc revolution in which the second track turn T1 is reproduced, the first field memory 70 continues the reproduction of the recorded video signal a2 in the initial two-field period and, in the latter two-field period, interrupts the reproducing operation. On the other hand, the second field memory 71 is completely inoperative during the initial two-field period and, in the latter two-field period and, further, in the succeeding two-field period, is controlled to carry out reproduction of the recorded video signal a4. Thereafter, the above described operation is repeated.

Thus, at the time of half-speed, forward-direction, slow-motion reproduction, an operation which comprises reproducing twice one and the same track turn, shifting to the adjacent track turn on the inner side without kicking back, repeatedly reproducing twice this adjacent track turn, and shifting to the succeeding adjacent track turn without kicking back is repeated. In the fist period of reproducing one and the same track turn in these two cycles of repeated reproduction of the same track turn, the first field memory 70 is so controlled as to perform in sequence the operations, in every one-field period, of erasing, recording of the reproduced video signal, and reproducing in the two-field period of the recorded signal of the memory. At the same time, the seocnd field memory 71 is so controlled as to perform in sequence the operations of reproducing in a two-field period of the recorded signal of the memory and thereafter erasing and recording every one-field period.

Furthermore, operation control is so carried out that, during the second cycle of reproduction of the same track turn, the first field memory 70 repeatedly reproduces, in the initial portion of the two-field period, the video signal recorded in that field memory, and the second field memory 71 repeatedly reproduces, in the latter portion of the two-field period, the video signal recorded in that field memory. As a consequence, the first field memory 70 produces as output the video signal of the second field of the reproduced track turn during the period of one disc revolution, while the second field memory 71 produces as output the video signal of the fourth field of the reproduced track turn during one disc revolution period, these operations of the first and second field memories being alternately repeated. For this reason, a half-speed, forward-direction, slow-motion reproduced picture of less oscillation of the picture than that heretofore attainable is obtained by the system of the present invention.

Next, ¼-speed forward-direction, slow-motion reproduction will be considered. In this case, the reproducing stylus repeatedly reproduces four times one and the same track turn and then shifts to the adjacent track turn on the inner side. In the time of this reproduction, the two field memories 70 and 71 are so controlled as to carry out the operations indicated below (¼)F in FIG. 9. More specifically, the first field memory 70 is subjected, in the period of the first reproduction of the track turn T1, to the same operation control as that at the time of ½-speed, slow-motion reproduction as indicated below ① of (¼)F and, in the second reproducing period of the track turn T1, is so controlled as to continuously carry out reproduction of the video signal a2 recorded in the four-field period and then to further carry out reproduction of video signal a2 through the initial part of the two-field interval in the third reproduction period of the track turn T1.

On the other hand, the second field memory 71 is subjected, in the period of the first reproduction of the track turn T1, to the same operation control as that at the time of ½-speed, slow-motion reproduction and, in the second reproducing period of the track turn T1, is so controlled as to carry out no operation, as indicated below ② of (¼)F in FIG. 9. The second field memory 71 is further so controlled as to start reproducing the video signal a4 of the fourth field of the track turn T1 from the three-field interval in the third reproducing period of the track turn T1 and to continuously carry out this reproduction during the fourth reproducing period of the track turn T1 and through the initial two-field interval in the first reproducing period of the succeeding track turn T2. Thereafter, the above described operation is repeated.

Thus, at the time of ¼-speed, forward-direction, slow-motion reproduction, in the first reproducing period of the same track turn, the first field memory 70 is controlled to carry out the operations, in sequence, of erasing, recording of the reproduced video signal, and repeated reproduction of the two-field interval of the recorded signal of the memory. At the same time, the second field memory 71 is controlled to carry out the operations, in sequence, of repeated reproducing of the two-field interval of the recorded signal of the memory (exclusive of the time of reproduction of the track turn T1), erasing and recording of the video signal of the fourth field of that track turn.

Then, in the second reproducing period of the same track turn, the recorded signal from only the first field memory 70 is repeatedly reproduced, and, in the third reproducing period of the same track turn, changing over is carried out from the reproduction of the memorized signal of the first field memory 70 to the reproduction of the memorized signal of the second field memory 71. In the fourth reproducing period of the same track turn, the memorized signal from only the second field memory 71 is repeatedly reproduced. In this manner and sequence, the first and second field memories 70 and 71 are controlled. As a result, at the time of ¼-speed, slow-motion reproduction, the video signal of the second field of the reproduced track turn and the video signal of the fourth field are respectively reproduced alternately, each during two revolution periods. Therefore, it is possible to obtain a ¼-speed, slow-motion reproduced picture of less oscillation of the picture than in the case wherein the video signals of the first and fourth fields are successively and cyclically reproduced in a repeated manner as in the prior art.

Similarly, in ⅛-speed, slow-motion reproduction, as indicated below (⅛)F in FIG. 9, the signals of the second field and the fourth field of the reproduced track turn are alternately changed over and thus produced as output every period of four disc revolutions from the two field memories 70 and 71. In the 1/6-speed, forward-direction, reproduction mode, as indicated at (1/16)F in FIG. 9, the signals of the second field and the fourth field of the reproduced track turn are alternately changed over and thus produced as output every period of eight disc revolutions from the two field memories 70 and 71.

In the case of the above described forward-direction, slow-motion reproduction, the two field memories 70 and 71 are controlled in the period of one disc revolution (here, one period of the tracking signal fp3) in any of four modes as described below in any of the cases of ½-speed, ¼-speed, ⅛-speed, and 1/16-speed, slow-motion reproduction, as indicated in FIG. 9. In the first mode of operation control (hereinafter referred to as mode A for the sake of convenience), one of the two field memories 70 and 71 carries out in sequence erasing, recording, and reproducing of a two-field interval, while the other carries out, sequentially, reproducing of a two-field period, erasing, and recording. In the second mode of operation control (hereinafter referred to as mode B), one of the field memories carries out reproduction in a two-field interval, and then the other field memory carries out reproduction in a two-field interval. In the third mode of operation control (hereinafter referred to as mode C), one of the field memories continues the reproducing operation in the period of one disc revolution. In the fourth mode (hereinafter referred to as mode D), the other field memory continues the reproducing operation in the period of one disc revolution.

More specifically, in the case of carrying out forward-direction, slow-motion reproduction at ½n speed (where n is a natural number), in accordance with the present embodiment of the invention, the two-field memories 70 and 71 are so controlled by the output of the pulse generator 63 that the above described modes of operation control are successively carried out in the sequence A, C, B, and D, the mode A being carried out once, the mode C (n−1) times, the mode B once, and the mode D (n−1) times. By this operation, a ½n-speed, forward-direction, slow-motion reproduced picture of high quality can be obtained.

In the case where 1/(2n+1)-speed, forward-direction, slow-motion reproduction is to be carried out, the two field memories 70 and 71 are so controlled that, similarly as described above, the mode A is carried out once, the mode C (n−1) times (or n times), the mode B once, and the mode D n times (or (n−1) times) cyclicly in sequence.

Next, the control operation of the two field memories 70 and 71 at the time of backward-direction, slow-motion reproduction will now be described in conjunction with FIG. 10.

First, at the time of ½-speed, backward-direction, slow-motion reproduction, the two-field memories 70 and 71 are subjected to the operation control indicated below ① and ② of (½)B shown in FIG. 10. It will be supposed that reproduction has been started from the initial end position of the track turn T7. Then, after reproducing the initial portion of the track turn T7, the reproducing stylus is shifted, at the time instant at which the vertical synchronizing signal V27 is reproduced, toward the disc outer periphery to the track turn T6. Then, at the instant at which it has reproduced the reference signal fp3 recorded along this track turn T6, the reproducing stylus is again shifted toward the disc outer periphery and shifts to the same track turn T6. Next, after it has reproduced this track turn T6 in the period of one disc revolution and the instant at which it has again reproduced the reference signal fp3, the reproducing stylus is shifted toward the disc outer periphery to the same track turn T6. Thereafter, the same operation as described above is repeated, and the reproducing stylus, after reproducing the same track turn during the period of two disc revolutions, is shifted outward to the adjacent track turn on the outer side at the recorded positions of the vertical synchronizing signals V27, V23, V19, . . . corresponding to the recorded positions of the reference signal fp3.

At the time of this ½-speed, backward-direction, slow-motion reproduction, the first field memory 70 is so controlled that, during the initial one-field interval of the two-field period in the initial half portion of the track turn T7, an erasing operation is carried out, that, during the succeeding one-field interval, recording of the video signal g2 of the second field of the reproduced track turn T7 is carried out, and that, thereafter, during the total of four field periods of two fields in the latter half portion and two fields in the initial half portion of the track turn T6, reproduction of the video signal g2 recorded in the memory is repeatedly carried out four times, reproduction being stopped in the period of the succeeding two fields. In the further succeeding one-field period, the operation returns to the above mentioned erasing operation. The above described operation control of the first field memory 70 is repeated, and the video signals g2, f2, e2, d2, c2, and b2 of the second field of the reproduced track turn are repeatedly reproduced, one during the period of one disc revolution every other period of one disc revolution.

On the other hand, the second field memory 71 is so controlled that, as indicated below ② of (½)B in FIG. 10, in the period of one field from the position at which the vertical synchronizing signal V23 of the track turn T6 is recorded, erasing operation is carried out, and, in the period of the succeeding one field, the video signal f4 of the fourth field of the track turn T6 being reproduced at that time by the reproducing stylus is recorded. Further, the second field memory 71 is so controlled that, in the period of the succeeding two fields, reproducing is not carried out, but the above mentioned recorded video signal f4 is repeatedly reproduced four times in the four-field period from the third field, after which, in the succeeding one-field period, erasing operation is carried out. The operation control as described above of the second field memory 71 is repeated, and the video signals f4, e4, d4, c4, b4, and a4 of the fourth field of the reproduced track turn are repeatedly reproduced, one for each period of one disc revolution every other period of one revolution of the disc.

Thus, at the time of ½-speed, backward-direction, slow-motion reproduction, one of the first and second field memories 70 and 71 is so controlled as to carry out, in sequence, erasing, recording of the reproduced video signal, and reproducing in a two-field period the recorded signal of the memory. At the same time, the other field memory is so controlled that the operations of reproducing during a two-field period of the recorded signal of the memory, erasing, and recording of the reproduced video signal are carried out. The period of one disc revolution in which this operation control is carried out and the period of one disc revolution in which the reproducing in the two-field period of one field memory and reproducing in the following two-field period of the other field memory are carried out, alternately repeated. As a result, a ½-speed, backward-direction, slow-motion reproduced picture with little oscillation is obtained.

Then, in ¼-speed, backward-direction, slow-motion reproduction, the two-field memories 70 and 71 are operation controlled in the following four modes A′, C, B, and D. As indicated ① and ② of (¼)B in FIG. 10, of the two-field memories 70 and 71, one is controlled to carry out, within the period of one disc revolution, erasing, recording during one field the reproduced video signal, and reproducing the recorded signal of the memory during a two-field period, while the other field memory is controlled to carry out reproducing of the recorded signal of the memory during a two-field period, erasing, and recording in one field period of the reproduced video signal. This is the mode A′. In the mode C, only one of the field memories repeatedly reproduces the memory recorded signal within the period of one disc revolution. In the mode B, within the period of one disc revolution, one of the field memories reproduces the memory recorded signal during a two-field period, and thereafter the other field memory reproduces the memory recorded signal during a two-field period. In the mode D, within the period of one disc revolution, only the other field memory repeatedly reproduces the memory recorded signal. These modes A′, C, B, and D are successively repeated.

As described hereinbefore, the reproducing stylus is caused to move toward the disc outer periphery as the stylus repeatedly reproduces each track turn four times, and the video signal of the second field and the video signal of the fourth field of the reproduced track turn are respectively reproduced and sent out as output alternately every period of two disc revolutions. Therefore, a ¼-speed, backward-direction, slow-motion reproduced picture of low degree of oscillation of the picture is obtained.

Similarly, at the time of ⅙-speed, backward-direction slow-motion reproduction, the reproducing stylus is moved toward the outer periphery of the disc as the stylus repeatedly reproduces the same track turn eight times. At the same time, the two field memories 70 and 71 are so controlled that, as indicated below ① and ② of (½)B in FIG. 10, the mode A' is repeated once, the mode C twice, the mode B once, and the mode D twice in the stated order. Furthermore, at the time of 1/16-speed, backward-direction, slow-motion reproduction, the reproducing stylus is moved toward the outer periphery of the disc as the stylus repeatedly reproduces the same track turn 16 times. The operation control of the two field memories is carried out as indicated below ① and ② of (1/16)B in FIG. 10.

Thus, the mode B, C, and D of operation of the two field memories during one disc revolution in the case of backward-direction, slow-motion reproduction are respectively the same as those of the aforedescribed forward-direction, slow-motion reproduction. However, the aforementioned mode A differs on the point that it is accompanied by kick back and inversion of switching pulses at the instant of completion of recording of one of the field memories, that is, the instant of start of erasing of the other field memory (this being called mode A'). Accordingly, in the case of ½n-speed, backward-direction, slow-motion reproduction, in accordance with the present embodiment of the invention, the two field memories 70 and 71 are so controlled that the mode A' is carried out once, the mode C (n−1) times, the mode B once, and the mode D (n−1) times in the stated order. By this operation control, a ½-speed, slow-motion reproduced picture of high quality can be obtained.

In the case where 1/(2n+1)-speed, backward-direction, slow-motion reproduction is to be carried out, the two field memories are so controlled that the mode A' is carried out once, the mode C (n−1) times (or n times), the mode B once, and the mode D n times (or (n−1) times).

While the present invention is suitable for application to discs according the aforementioned proposal, it is also possible to apply the invention to discs of other recording modes.

Furthermore, this invention is not limited to these embodiments but various variations and modifications may be made without departing from the scope of the invention.

What is claimed is:

1. A slow-motion reproducing system in an apparatus for reproducing video signals from a rotary recording medium on which said signals of a plurality of fields each are recorded along a spiral track for every interval corresponding to one revolution of the medium, said system comprising:

a reproducing element for tracing along the track of the rotary recording medium and reproducing the signals recorded therealong;

means operating in response to skip pulses applied thereto to cause the reproducing element to shift and skip to an adjacent track turn;

means for generating skip pulses corresponding to modes in which slow-motion reproduction differing from normal reproduction is carried out every period of revolution of the rotary recording medium, said skip pulses being thus generating with timing corresponding to the vertical blanking period positions of the recorded video signals, and for supplying the skip pulses to the skip means;

means for demodulating the signal reproduced by the reproducing element;

first and second field memories respectively supplied with demodulated video signals from the demodulating means; and operation control means for carrying out operation control of the operations of recording of the demodulated video signals respectively in the first and second field memories, reproducting of the video signal thus recorded, and erasing of the recorded video signals, the skip pulse supplying means operating at the time of 1/m-speed (where m is a natural number greater than 2), forward-direction, slow-motion reproduction to supply skip pulses for causing the reproducing element to skip at one specific position among the plurality of vertical blanking period positions per track turn so as to cause the reproducing element to trace the same track turn every (n−1) revolutions of the rotary recording medium and thereafter ceasing to generate the skip pulses in the succeeding one revolution, and operating at the time of 1/n-speed, backward-direction, slow-motion reproduction to respectively supply skip pulses for causing the reproducing element to skip continually in the position of the vertical blanking period at said specific position and skip pulses for causing the reproducing element to skip every specific number of revolutions of the rotary recording medium at the position of the vertical blanking period at a specific position other than said specific position per track turn, the operation controlling means operating to appropriately select any mode of operation control from among: a first mode in which one of the two field memories operates within the period of one revolution of the rotary recording medium to carry out, in sequence, erasing, recording of the reproduced video signal, and reproducing of the recorded signal of that memory, while the other field memory operates to carry out, in sequence, reproducing of the memory recorded signal, erasing, and recording of the reproduced video signal; a second mode in which there is a changeover from the reproduced output of said one of the field memories to the reproduced output of the other field memory within the period of one revolution of the rotary recording medium; a third mode in which said one of the field memories continues to reproduce the memory recorded signal thereof in the period of one revolution of the rotary recording meidum; and a fourth mode in which said other field memory continues to reproduce the memorized signal in the period of one revolution of the rotary recording medium, and operating to cause the recorded video signals corresponding to one field to be alternately and repeatedly produced as output from the first and second field memories at every field over said plurality of fields.

2. A slow-motion reproducing system as claimed in claim 1 in which, at the time of 1(2n)-speed (where n is a natural number), slow-speed reproduction, the operation controlling means so controls the two field memories that said first, third, second, and fourth modes are carried out in the stated sequence and, moreover, repeatedly in a cyclic manner, in each cycle of which the first mode is carried out once, the third mode is carried out (n−1) times, the second mode is carried out once, and the fourth mode is carried out (n−1) times.

3. A slow-motion reproducing system as claimed in claim 1 in which, at the time of 1/(2n+1)-speed (where n is a natural number), slow-motion reproduction, the operation controlling means so controls the two field memories that said first, third, second, and fourth modes are carried out in the stated sequence and, moreover, repeatedly in a cyclic manner, in each cycle of which the first mode is carried out once, the third mode is carried out (n−1) times (or n times), the second mode is carried out once, and the fourth mode is carried out n times (or (n−1) times).

4. A slow-motion reproducing system as claimed in claim 1 in which, at times other than the time of skipping of the reproducing element, the skip means carries out tracking control in a manner such that the reproducing element traces normally along the track.

5. A slow-motion reproducing system as claimed in claim 1 in which the skip pulse generating means operates to generate skip pulses of waveforms which have mutually inverted relationships respectively corresponding to the operation wherein the reproducing element is caused to skip in the forward-direction and to the operation wherein the reproducing element is caused to skip in the backward direction.

6. A slow-motion reproducing system as claimed in claim 1 in which the rotary recording medium has first and second reference signals of mutually different frequencies recorded on a reference signal track disposed between mutually adjacent track turns of the medium, the first and second reference signals being recorded along the reference signal track in a state wherein they are alternately changed over for every one revolution of the rotary recording medium, a third reference signal being recorded at vertical blanking period recorded positions corresponding to the positions of the changing over and recording of the first and second pilot signals.

* * * * *